(12) United States Patent
Cheston et al.

(10) Patent No.: US 7,257,701 B2
(45) Date of Patent: Aug. 14, 2007

(54) METHOD AND SYSTEM FOR CONFIGURING AN OPERATING SYSTEM IN A COMPUTER SYSTEM

(75) Inventors: Richard Wayne Cheston, Morrisville, NC (US); Daryl Carvis Cromer, Apex, NC (US); Howard Jeffrey Locker, Cary, NC (US); David Benson Rhoades, Apex, NC (US); Randall Scott Springfield, Chapel Hill, NC (US); James Peter Ward, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 995 days.

(21) Appl. No.: 09/990,003

(22) Filed: Nov. 21, 2001

(65) Prior Publication Data

US 2003/0097554 A1   May 22, 2003

(51) Int. Cl.
*G06F 15/00* (2006.01)
(52) U.S. Cl. .......................................... 713/1; 713/2
(58) Field of Classification Search .................... 713/1, 713/2, 100; 710/260, 261
See application file for complete search history.

(56) References Cited

U.S. PATENT DOCUMENTS

| | | | |
|---|---|---|---|
| 4,185,282 A | 1/1980 | Pick | 340/711 |
| 4,459,581 A | 7/1984 | Wilson et al. | 340/365 |
| 4,879,557 A | 11/1989 | Roche | 341/23 |
| 5,127,748 A * | 7/1992 | Okimoto et al. | 400/70 |
| 5,428,772 A * | 6/1995 | Merz | 707/4 |
| 5,450,078 A | 9/1995 | Silva et al. | 341/23 |
| 5,973,675 A | 10/1999 | Joto et al. | 345/168 |
| 6,014,616 A * | 1/2000 | Kim | 704/8 |
| 6,178,503 B1* | 1/2001 | Madden et al. | 713/2 |
| 6,182,099 B1* | 1/2001 | Nakasato | 715/536 |
| 6,205,418 B1* | 3/2001 | Li et al. | 704/8 |
| 6,219,721 B1* | 4/2001 | Su | 710/2 |
| 6,246,976 B1* | 6/2001 | Mukaigawa et al. | 704/9 |
| 6,326,953 B1* | 12/2001 | Wana | 345/168 |
| 6,467,038 B1* | 10/2002 | Piwonka et al. | 713/1 |
| 6,559,861 B1* | 5/2003 | Kennelly et al. | 715/703 |
| 6,615,303 B1* | 9/2003 | Endo et al. | 710/260 |

* cited by examiner

*Primary Examiner*—A. Elamin
(74) *Attorney, Agent, or Firm*—Sawyer Law Group LLP

(57) ABSTRACT

A method and system for configuring an operating system in a computer system including language selection during bootup rather than at manufacture. A first aspect of the method and system comprises providing a plurality of operating system images in the computer system, each of the plurality of operating system images being based upon a particular language, selecting one of the plurality of operating system images based on the language supported by the computer system and loading the selected operating system image into the computer system. A second aspect of the method and system comprises providing a language-independent operating system image in the computer system, determining a language supported by the computer system, loading the language-independent operating system image into the computer system, and associating the language supported by the computer system with the language-independent operating system image.

15 Claims, 5 Drawing Sheets

METHOD AND SYSTEM FOR CONFIGURING AN OPERATING SYSTEM IN A COMPUTER SYSTEM

CROSS-RELATED APPLICATIONS

The present application is related to application Ser. No. 09/990,084 entitled "Method and System for Configuring the Language of the BIOS in a Computer System," now U.S. Pat. No. 6,996,705 assigned to the assignee of the present application and filed on the same date.

FIELD OF THE INVENTION

The present invention relates to computer systems and specifically to a method and system for configuring an operating system in a computer system.

BACKGROUND OF THE INVENTION

Today, personal computers are used in many different countries throughout the world encompassing many different languages. Consequently, each different language requires a different operating system image to support that specific language, e.g. the French language requires a French operating system image, the Chinese language requires a Chinese operating system image, etc. Conventionally, computer systems are hard wired for a particular language when each system is built. In other words, the operating system image is provided based on a particular language at build time. This creates a problem if the user subsequently needs to use the system in a country with a language different than that in which the computer system was hard wired or because more than one language is spoken in the country, because the system must then be re-built with the correct operating system image. This can be a tedious and cumbersome process if a computer is utilized in several different languages.

Therefore, what is needed is a method and system that allows for the automatic selection of an appropriate operating system image based on the language requirement. The method and system should be simple, cost effective and capable of being easily adapted into existing technology. The present invention addresses such a need.

SUMMARY OF THE INVENTION

The present invention comprises a method and system for configuring the language of an operating system in a computer system. A first aspect of the method and system comprises providing a plurality of operating system images in the computer system, each of the plurality of operating system images being based upon a particular language, selecting one of the plurality of operating system images based on the language supported by the computer system and loading the selected operating system image into the computer system.

A second aspect of the method and system comprises providing a language-independent operating system image in the computer system, determining a language supported by the computer system, loading the language-independent operating system image into the computer system, and associating the language supported by the computer system with the language-independent operating system image.

Through the use of the method and system in accordance with the present invention, the language being supported by the computer system is determined when the computer system is booted up as opposed to when the computer system is being built. This results in an increase in manufacturing productivity since original equipment manufacturers can build computer systems without having to worry about language restrictions. The language is chosen at time of use by the end user versus being predefined at manufacturing time. This is critical in regions where multiple different languages are spoken and there is no way of knowing which language the end user prefers at time of system build.

DETAILED DESCRIPTION

The present invention relates to a method and system for determining the operating system operating system image in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is presented in the context of a preferred embodiment. The preferred embodiment of the present invention is a method and system for determining the operating system image in a computer system based on a particular language. Through the use of the present invention, the language being supported by the operating system is determined by querying the keyboard when the computer system is booted.

Figure 1:
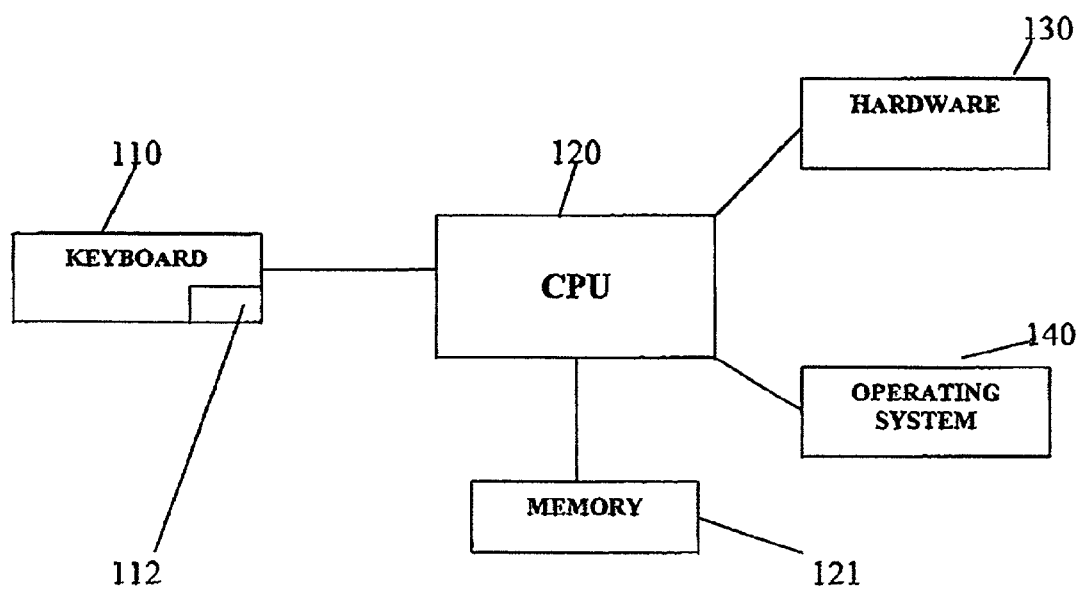
FIG. 1 is a system in accordance with the present invention.

For a further understanding of the present invention, please refer now to FIG. 1. FIG. 1 is a system 100 in accordance with the present invention. The system 100 comprises a Universal Serial Bus (USB) keyboard 110, a central processing unit 120, computer hardware 130, and an operating system 140. The USB keyboard 110 is coupled to the central processing unit 120 wherein the central processing unit 120 is coupled to the computer hardware 130 and the operating system 140.

The central processing unit 120 refers to the processor, the memory (RAM) and the I/O architecture (channels or buses). A memory 121 is coupled to the central processing unit 120. The operating system 140 is the master control program that runs the computer. It sets the standards for all application programs that run in the computer.

The USB keyboard 110 includes a plurality of device descriptor files 112. The device descriptor files 112 contain information related to the keyboard, e.g. what type of device it is, who made the device, etc. The device descriptor files 112 also contain user defined fields called report descriptors. Report descriptors are strings of information that the operating system 140 can read. Report descriptors are a method of passing useful information about the USB device to the operating system or device driver. They are unique for each type of USB device. Report descriptors adhere to the following format: Item Type, Item Length, Item Value.

The system and method in accordance with the present invention takes advantage of this feature of a USB keyboard to allow for configuring the operating system in a computer system. In accordance with the present invention, a new report descriptor (hereinafter "the language report descriptor") contains a new Item Type (first field in the report descriptor) defined as the keyboard language. The new Item Type would be a value currently unused within the USB Keyboard device class. This value would be picked from the unused values and would then be defined as the language report descriptor. The next field (Item Length) is how many bytes are reserved for the language value. The last field (Item Value) is the language of the USB keyboard. The language report descriptor identifies the particular language that the USB keyboard 110 supports.

Based on this new item type, the language that the computer system will support can be determined by querying the keyboard upon the initialization of the computer system. Once the language is determined, the operating system image for the system is selected based on the language supported by the keyboard and utilized to configure the computer system. Accordingly, if a system user needs to change the language being supported by the computer system, the system user would simply swap the current keyboard with a keyboard that supports the desired language and then reboot the computer system.

Although the above described embodiment of the present invention is described in the context of utilizing the keyboard to determine the language being supported, one of ordinary skill in the art will readily recognize that a variety of devices could be utilized to determine the language being supported by the computer system while remaining within the spirit and scope of the present invention.

A method in accordance with the present invention may be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for determining the operating system image in a computer system based on a particular language.

This computer readable media may be contained in media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Figure 2:
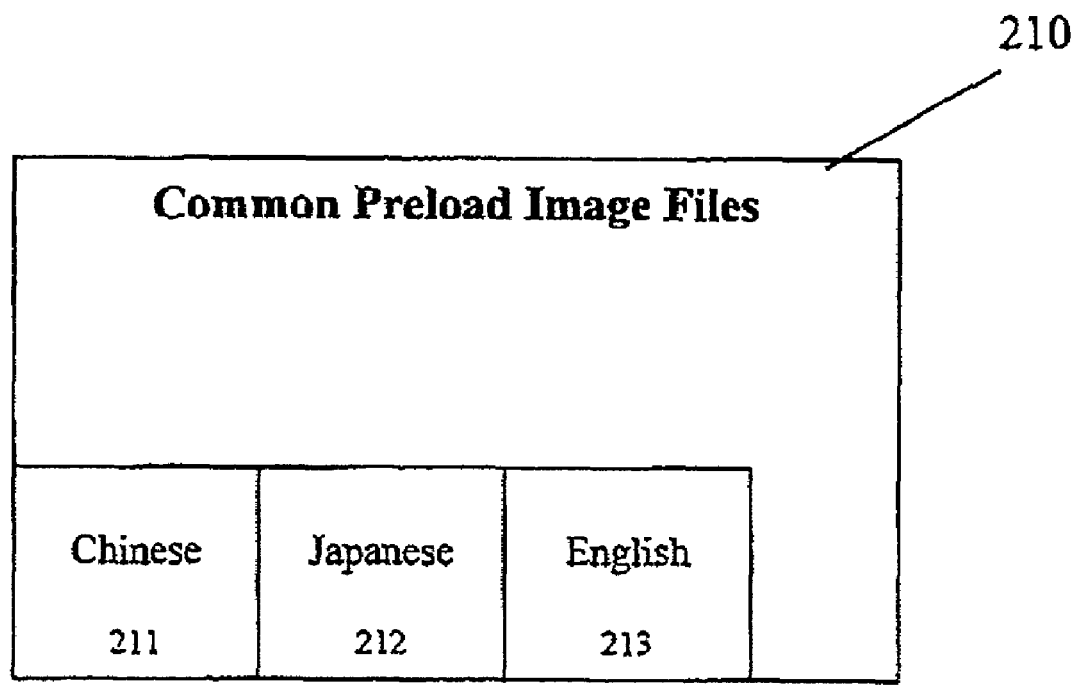
FIG. 2 shows a common operating system image file.
Figure 3:
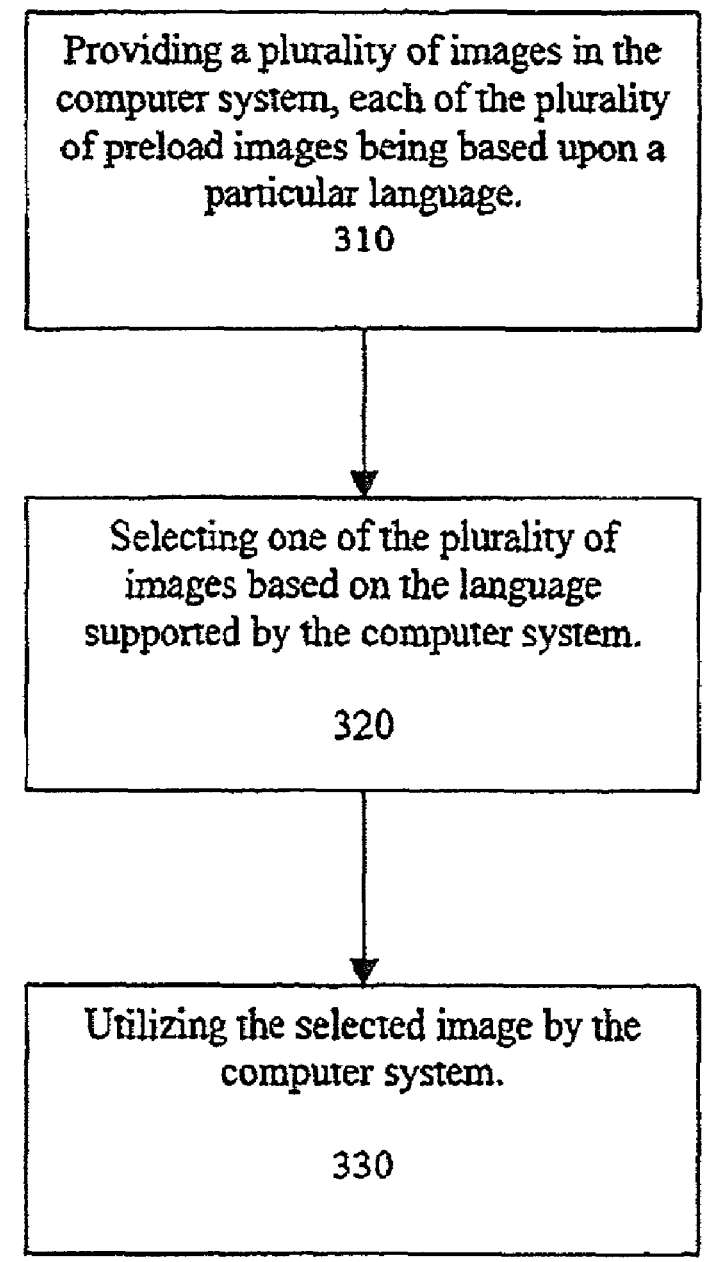
FIG. 3 shows a language independent operating system image and a language file.

In order to support multiple language operating system images within the computer system, one of two embodiments could be utilized. A first embodiment contemplates the utilization of a common operating system image file that contains a plurality of operating system images wherein each of the plurality operating system images supports a different language in the computer system. FIG. 2 is a block diagram of a common operating system image file 210 wherein the common operating system image file 210 contains a plurality of operating system images 211, 212, 213 for each supported language. FIG. 3 is a flowchart of the method in accordance with the first embodiment of the present invention.

Referring now to FIGS. 2 and 3 together, first, a select language control program with a plurality of operating system images are provided in the computer system, each operating system image being related to a particular language, via step 310. These are preferably stored within a memory bank of the computer system. Preferably the select language control program queries the keyboard to determine the language supported by the keyboard, by querying the report descriptors within the device descriptor files. Next, an operating system image is selected based on the language supported by the computer system, via step 320. The operating system image is selected from the plurality of operating system images located within the memory bank of the computer system. Finally, the selected operating system image is utilized by the computer system, via step 340.

Accordingly, a system user can change the language supported by the computer system by simply swapping the current keyboard with a keyboard that supports the desired language and then relocating the computer system.

A second embodiment contemplates the utilization of a language-independent operating system image in the computer system. What is meant by a language independent operating system image is an image with text strings that are generic strings that relate to a plurality of language files. Examples of such text strings can include the help files within the operating system, system messages, text on the start screens, etc. Once the operating system image is provided, the language can be selected from a plurality of language files that are stored in the computer memory and accordingly associated with the operating system image.

Figure 4:
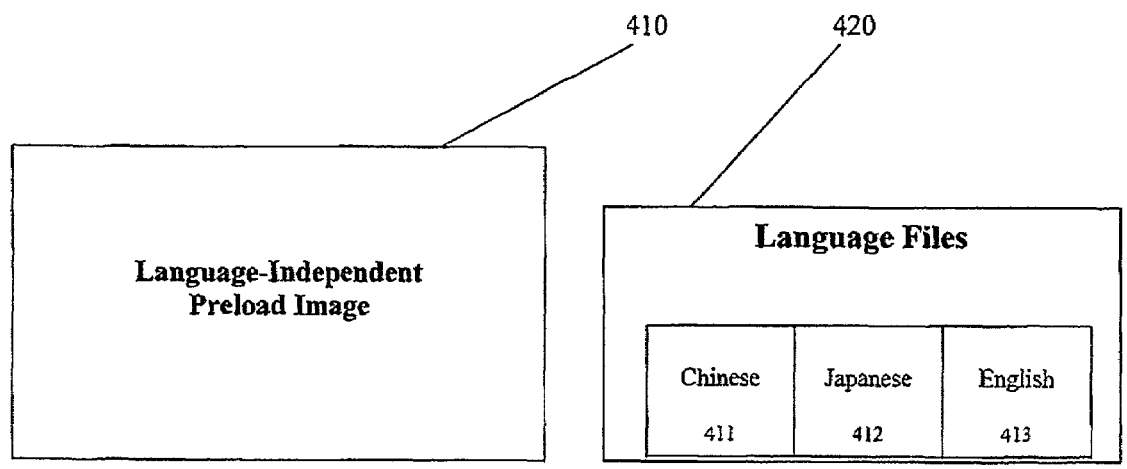
FIG. 4 is a flowchart of the method in accordance with a first implementation of the present invention.
Figure 5:
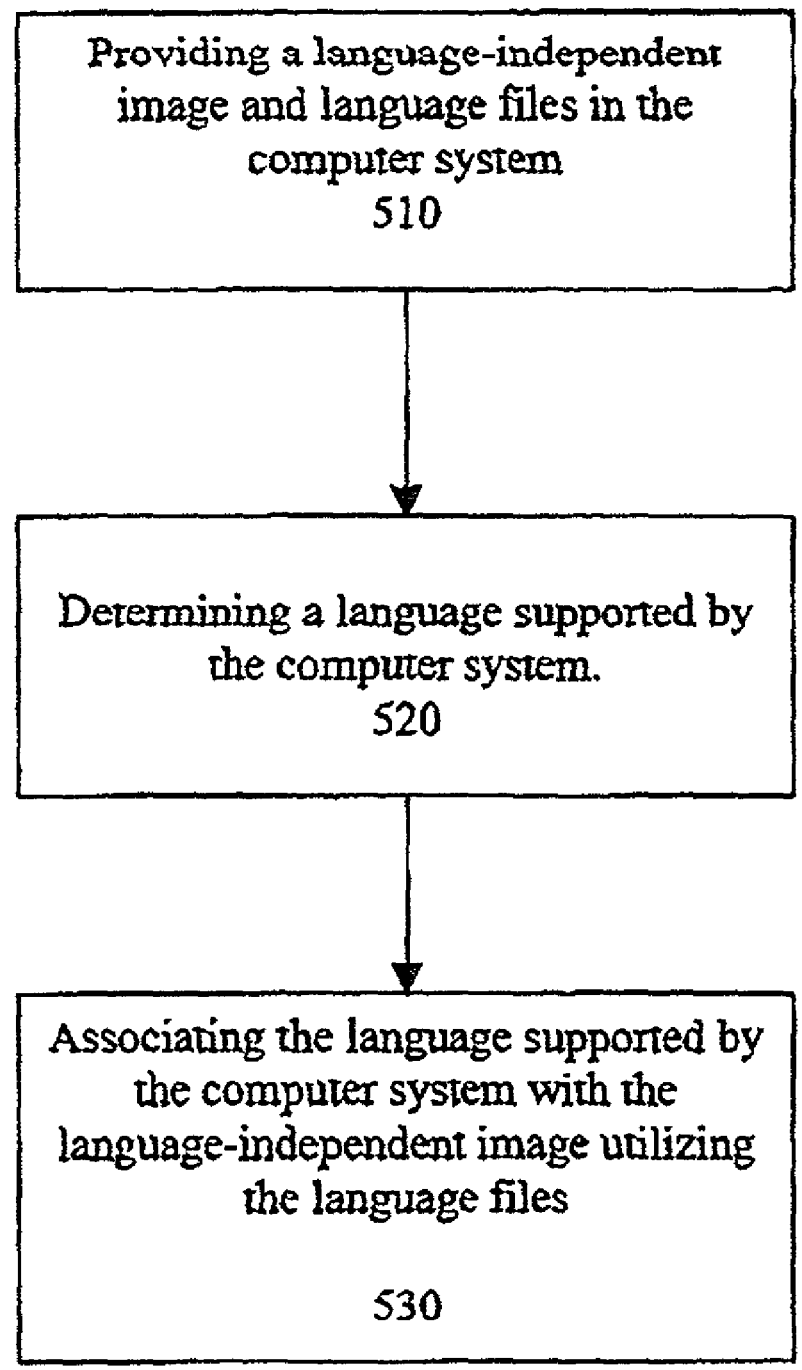
FIG. 5 is a flowchart of the method in accordance with a second implementation of the present invention.

FIG. 4 is a block diagram of a language-independent operating system image 310 and a plurality of language files 421, 422, 423 within a language file block 420. FIG. 5 is a flowchart of the method in accordance with the second embodiment of the present invention. Referring now to FIGS. 4 and 5 together, first a language independent operating system image 412 and language files 421, 422 and 423 are provided in the computer system via step 510. Next, the language supported by the computer system is determined, via step 520. Preferably a select language control program queries the keyboard to determine the language supported by the keyboard, by querying the report descriptors within the device descriptor files. Next, the language being supported by the computer system is associated with the language-independent operating system image utilizing one of the language files, via step 530. Each supported language has a predefined value which is stored in the last field (Item Value) of the report descriptor item within the USB keyboard. This value is than used to pick the correct language file. For example, the names of the language files can be equal to the value within report descriptor. In a detailed example, if the USB keyboard is Chinese, the value in the report descriptor is "Chinese" in ASCII. The name of the Chinese language file is "Chinese". Accordingly, a system user utilizing this embodiment can also change the language being supported by the computer system by simply swapping the current keyboard with a keyboard that supports the desired language and then rebooting the computer system.

A method and system in accordance with the present invention for configuring the operating system of a computer system based on a particular language is disclosed. Through the use of the method and system in accordance with the present invention, the language being supported by the computer system is determined when the computer system is booted up as opposed to when the computer system is being built. This results in an increase in manufacturing productivity since original equipment manufacturers can build computer systems without having to worry about language restrictions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for configuring an operating system in a computer system, the method comprising the steps of:
   a) providing a language-independent operating system image and a plurality of language files in the computer system;
   b) determining a language supported by the computer system; and
   c) associating the language supported by the computer system with the language-independent operating system image utilizing one of the language files.

2. The method claim 1, wherein step b) further comprises:
   b1) querying a keyboard of the computer system to determine the language being supported by the computer system.

3. The method of claim 2, wherein the keyboard comprises a universal serial bus (USB) keyboard.

4. The method of claim 3, wherein the keyboard comprises at least one report descriptor wherein the at least one report descriptor comprises a language supported by the computer system.

5. The method of claim 4, wherein step b1) further comprises:
   b1i) querying the at least one report descriptor to determine the language supported by the keyboard.

6. A system for configuring an operating system in a computer system, the system comprising:
   a) means for providing a language-independent operating system image and a plurality of language files in the computer system;
   b) means for determining a language supported by the computer system; and
   c) means for associating the language supported by the computer system with the language-independent operating system image utilizing one of the language files.

7. The system of claim 6, wherein the computer comprises a keyboard and the means for selecting one of the plurality of operating system images comprises means for querying the keyboard to determine the language being supported by the computer.

8. The system of claim 7, wherein the keyboard comprises a universal serial bus (USB) keyboard.

9. The system of claim 8, wherein the keyboard comprises at least one report descriptor and the at least one report descriptor comprises the language supported by the computer.

10. The system of claim 9, wherein the means for querying the keyboard further comprises:
    means for querying the at least one report descriptor to determine the language supported by the keyboard.

11. A computer-readable storage medium encoded with a computer program for configuring an operating system in a computer system, the computer program comprising computer-executable instructions for:
    providing a language-independent operating system image and a plurality of language files in the computer system;
    determining a language supported by the computer system; and
    associating the language supported by the computer system with the language-independent operating system image utilizing one of the language files.

12. The computer-readable storage medium of claim 11, wherein determining a language supported by the computer system further comprises:
    querying a keyboard of the computer system to determine the language being supported by the computer system.

13. The computer-readable storage medium of claim 12, wherein the keyboard comprises a universal serial bus (USB) keyboard.

14. The computer-readable storage medium of claim 13, wherein the keyboard comprises at least one report descriptor wherein the at least one report descriptor comprises a language supported by the computer system.

15. The computer-readable storage medium of claim 14, wherein
    querying the keyboard of the computer system to determine the language being supported by the computer system further comprises:
    querying the at least one report descriptor to determine the language supported by the keyboard.

* * * * *